Sept. 27, 1938.  J. D. PETSCHE ET AL  2,131,296
ELECTRIC VEHICLE JACK
Original Filed Dec. 24, 1934    5 Sheets-Sheet 1

Inventors
JOSEPH D. PETSCHE
& VICTOR BEZJAK

By

Attorneys

Sept. 27, 1938.   J. D. PETSCHE ET AL   2,131,296
ELECTRIC VEHICLE JACK
Original Filed Dec. 24, 1934   5 Sheets-Sheet 4

Inventors
JOSEPH D. PETSCHE
& VICTOR BEZJAK
By Richey & Watts
Attorneys

Sept. 27, 1938.  J. D. PETSCHE ET AL  2,131,296
ELECTRIC VEHICLE JACK
Original Filed Dec. 24, 1934  5 Sheets-Sheet 5

Inventors
JOSEPH D. PETSCHE
& VICTOR BEZJAK

Attorneys

UNITED STATES PATENT OFFICE 2,131,296

ELECTRIC VEHICLE JACK

Joseph D. Petsche and Victor Bezjak, Cleveland, Ohio

Refiled for abandoned application Serial No. 759,027, December 24, 1934. This application March 19, 1936, Serial No. 69,709

3 Claims. (Cl. 254—102)

This invention relates to a jacking system or apparatus for motor vehicles, and is a refile of our abandoned application, Serial No. 759,027, filed December 24th, 1934. The invention includes among its objects:

To provide a system of jacks which need not necessarily be a permanent or built-in unit but which may be installed as an accessory with a minimum amount of time and labor;

To provide an improved electrically-driven system of jacks preferably taking its power from the car battery;

To provide a jacking-up unit which may be controlled with ease and safety;

To provide a system of jacks which is positive in both its raising and lowering action;

To provide an electrically driven jacking unit of the accessory type which may be manufactured and sold at a cost commensurate with the cost of the motor vehicle to which it may be applied.

The foregoing and other objects and advantages will become apparent in view of the following description taken in conjunction with the drawings, wherein:

Fig. 2a is a sectional view taken on the line 2a—2a, Fig. 2;

Fig. 5 is a view in side elevation of the control switch shown removed from its panel-board.

Fig. 7 is a front view in elevation of the jack switch assembly; Fig. 7a is a rear view of the switch housing or box showing the electrical connections; and Fig. 7b is a sectional view taken on the line 7b—7b, Fig. 7.

Figure 1:
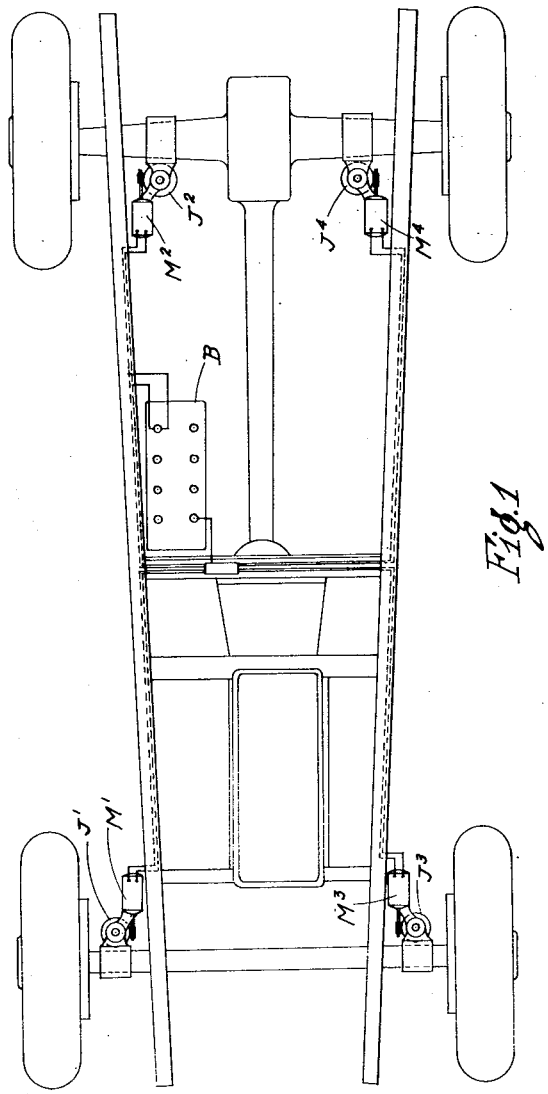
Figure 1 is a plan view of the chassis of a motor vehicle having the improved jacking apparatus installed thereon.
Figure 2:
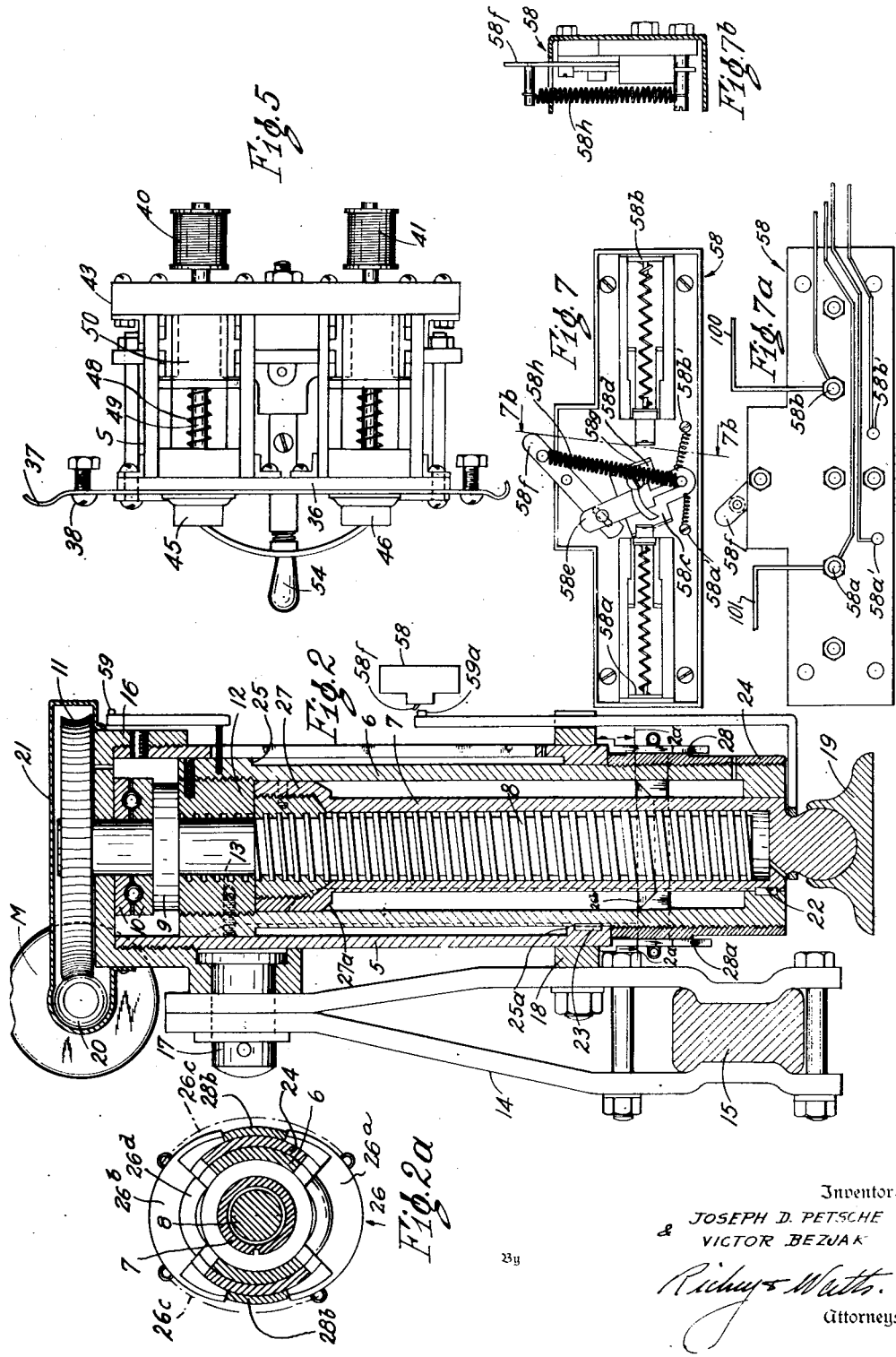
Fig. 2 is a substantially central transverse vertical section of a preferred type of double-stroke jack forming part of the system.

In its preferred form, the apparatus utilizes a jack for each wheel of a vehicle with a separate or individual motor for each jack. In Figs. 1 and 2, the jacks are generally indicated at $J^1$, $J^2$, $J^3$, $J^4$ and the motors at $M^1$, $M^2$, $M^3$, $M^4$.

Fig. 2 shows a preferred type of double-stroke jack, comprising an outer casing or housing 5 having therein a sliding sleeve 6 which in turn has slidingly mounted therein a tubular sleeve or lift 7 which is internally screw-threaded to accommodate a driving screw 8, the latter at its upper end being unthreaded and provided with a bearing collar 9 and bearings 10 and a drive gear 11. Threaded into the upper end of sleeve 6 is an internally threaded member 12 which is removable to facilitate assemblage and is locked to sleeve 6 by screw stud 13. A bracket 14 is provided and at its lower end is clamped over a suitable adjacent part of the chassis, such as the axle beam 15, and at its upper extremity the jack is provided with a cap 16 which is secured to this bracket by means such as trunnion 17, and at its lower extremity the jack has therearound a bracket 18 which is also secured to bracket 14. The lower end of the lift 7 is preferably provided with a ball head which engages in a foot 19.

The gear 11 is driven by a worm 20 which may be secured to the armature of motor M, a housing 21 protecting the worm and gear assembly. The motor M may be any one of those above specified and is supplied with current in a manner to be described.

Both the inner and outer sleeves 7 and 6 are preferably splined against rotative movement, as at 22 and 23, and at its lower extremity, the outer sleeve 6 has removably secured thereon a band or shell 24 adapted to abut against the outer casing 5 when the jack is raised.

The jack operates as follows:

When screw 8 is rotated through gear 11, worm 20 and motor M, it drives lift sleeve 7 downwardly until the latter contacts the bottom of sleeve 6, whereupon the internal threads of part 12 are caused to engage the threads of screw 8 and the sleeve 6 is also extended or driven downwardly until stop shoulder 25 contacts with $25^a$, at which point the drive on the motor is halted in a manner to be described.

To hold the inner lift sleeve in extended relation with the outer sleeve when both sleeves are extended, an automatic lock or clutch, generally indicated at 26, is provided and preferably comprises parts $26^a$ and $26^b$ which are in the form of segments built on outer semicircular shells and held in place under tension in recesses formed in the part 24 and the lower extremity of sleeve 6 by springs $26^c$, the upper surfaces of segments $26^a$ and $26^b$ being cammed as at $26^d$. The upper extremity of the lift sleeve 7 is formed with an enlargement or bearing boss 27 having its lower edge cammed, as at $27^a$, and when the sleeve 7 lowers, cam edge 27ª contacts 26ᵈ and spreads lock segments 26ª and 26ᵇ, permitting the boss 27 to pass down against bottom of sleeve 6, whereupon segments 26ª and 26ᵇ close in over said boss and lock the sleeve 7 in extended position. Secured to the casing 5 below the ring bracket 18 are oppositely-disposed cams 28 and 28ª, which have their shank portions 28ᵇ normally lying between the semi-cylindrical shells which carry the cam segments 26ª and 26ᵇ when the jack is closed. Assuming that both sleeves are extended, when sleeve 6 rises, the lower parts of cams 28 and 28ª spread the cam segments as said sleeve nears its elevated or closed position, thereby permitting boss 27 to pass upwardly and telescope in sleeve 6. The upper portions of cams 28 and 28ª may also serve to assist in holding outer sleeve 6 in its retracted position until sleeve 7 is fully extended by frictionally engaging the upper contiguous edges of the said semi-cylindrical shells when the inner sleeve is driven downwardly.

Figure 3:
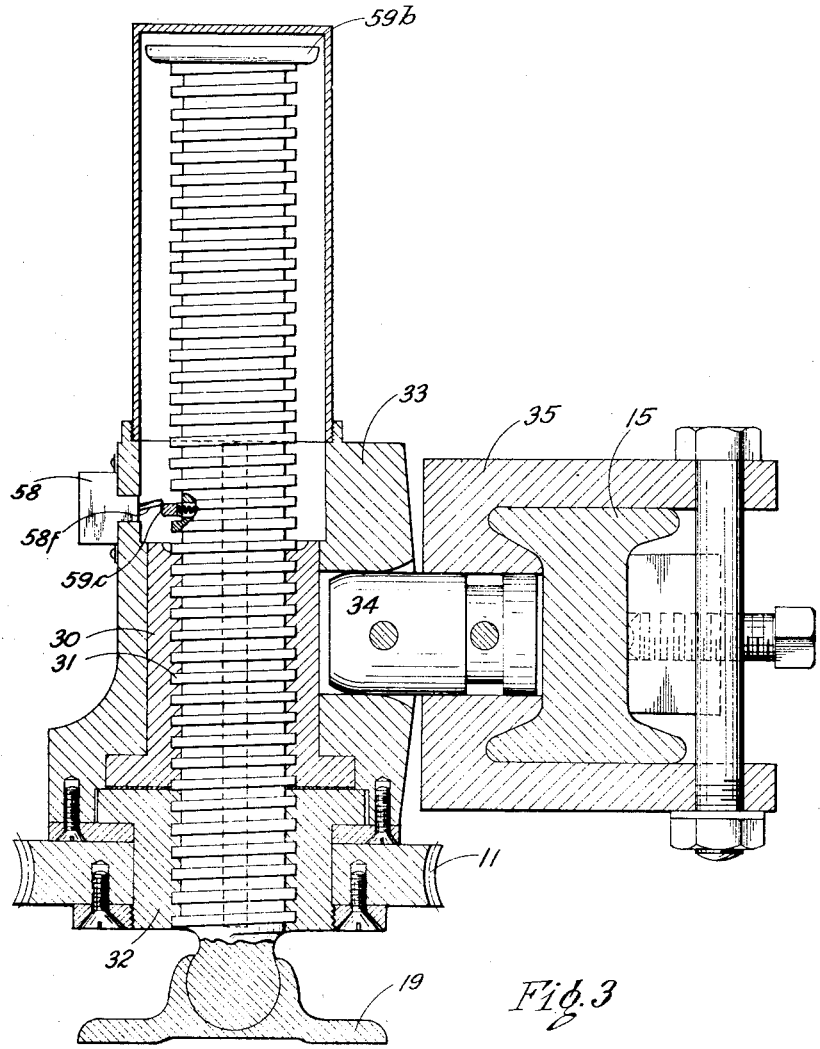
Fig. 3 is a view similar to Fig. 2 of a single-stroke jack.

In Fig. 3 a preferred type of single stroke jack is shown. In this type of jack, a sleeve 30 is provided which is internally screw threaded to receive a screw 31 having a bushing 32 secured on its lower end, which in turn has secured thereon the drive gear 11. Sleeve 30 is secured in a housing bracket 33 which in turn is mounted on a pin or trunnion 34, the latter being secured in a bracket 35 which is adjustably clamped to the axle 15. The construction and arrangement of the housing 33 and pin 34 is preferably such as to permit a limited rocking and rotational movement of the jack with respect to the axle bracket, to compensate for uneven footing of the entire set of jacks as well as irregularities in the ground surface.

The jack motors M are preferably of the reversible type, or are each so connected into the circuit that the current through the field or armature, for example, may be reversed in operating the jack. A main control switch is provided and is adapted to be mounted on the dashboard of the vehicle or at some other convenient location, and there are also a set of jack switches, one for each jack, whereby when any one or all of the jacks are extended or closed, the jack motor is automatically cut off.

Figure 6:
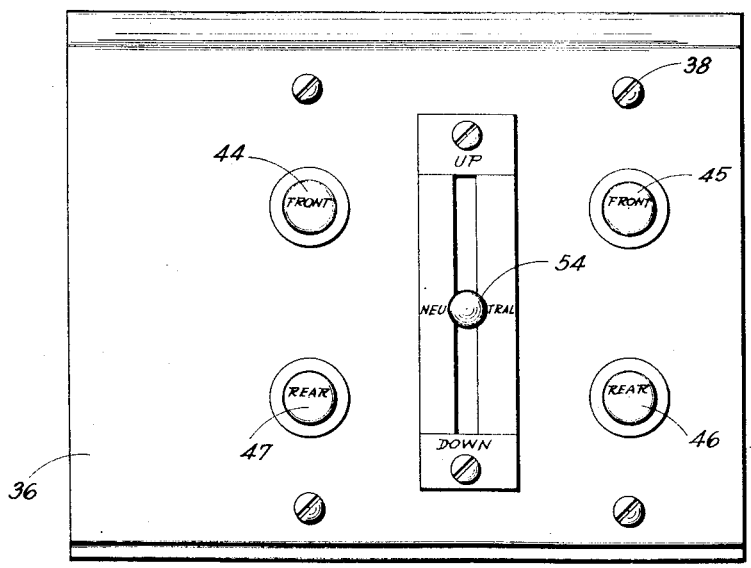
Fig. 6 is a front view of the switch or panel board.
Figure 6A:
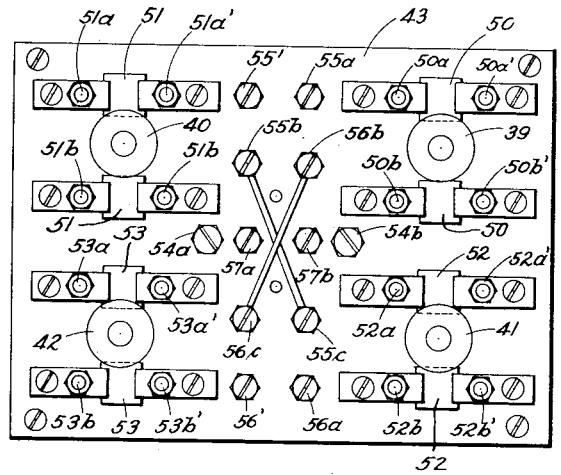
Fig. 6a is a rear view thereof, showing the various electrical connections.
Figure 5A:
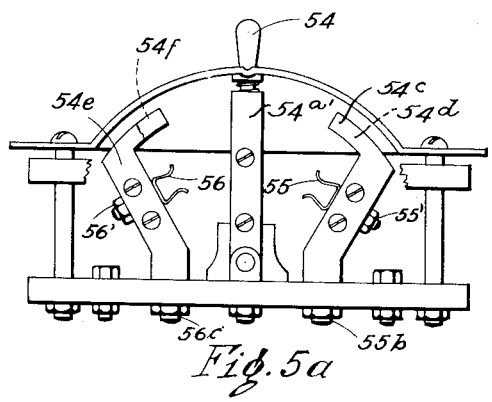
Figs. 5a to 5d, inclusive, are detail views of parts of the switch assembly.
Figure 5C:
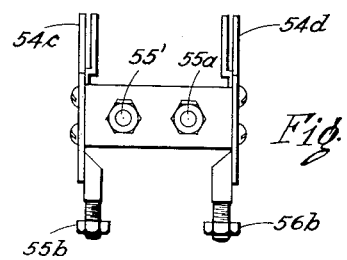
Figure 5B:
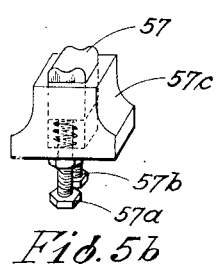
Figure 5D:
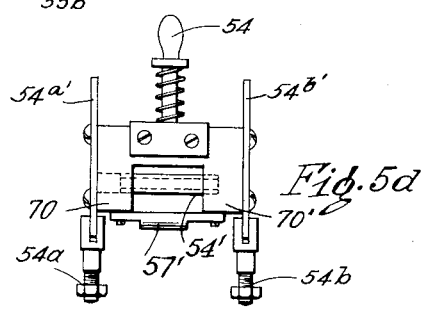

The main control switch is shown more or less in detail in Figs. 5 to 5d, inclusive, and Figs. 6 and 6a. A panelboard or like support is indicated at 36 and thereon is mounted the switch assembly generally indicated at S, Fig. 5, brackets 37 and screws 38 being provided for this purpose. The switch S includes four holding magnets or solenoids 39, 40, 41 and 42, for the switches 50 to 53 inclusive each of which is mounted on a switch board 43, and four push-button contact switches 44, 45, 46 and 47 each of which is urged to its return position by means of a spring 48. Each push button is secured on an operating rod 49 which carries contacts which when the push button is depressed closes the motor circuit and also the magnet circuit and energizes the magnet, the latter then holding the switch closed.

Figure 4:
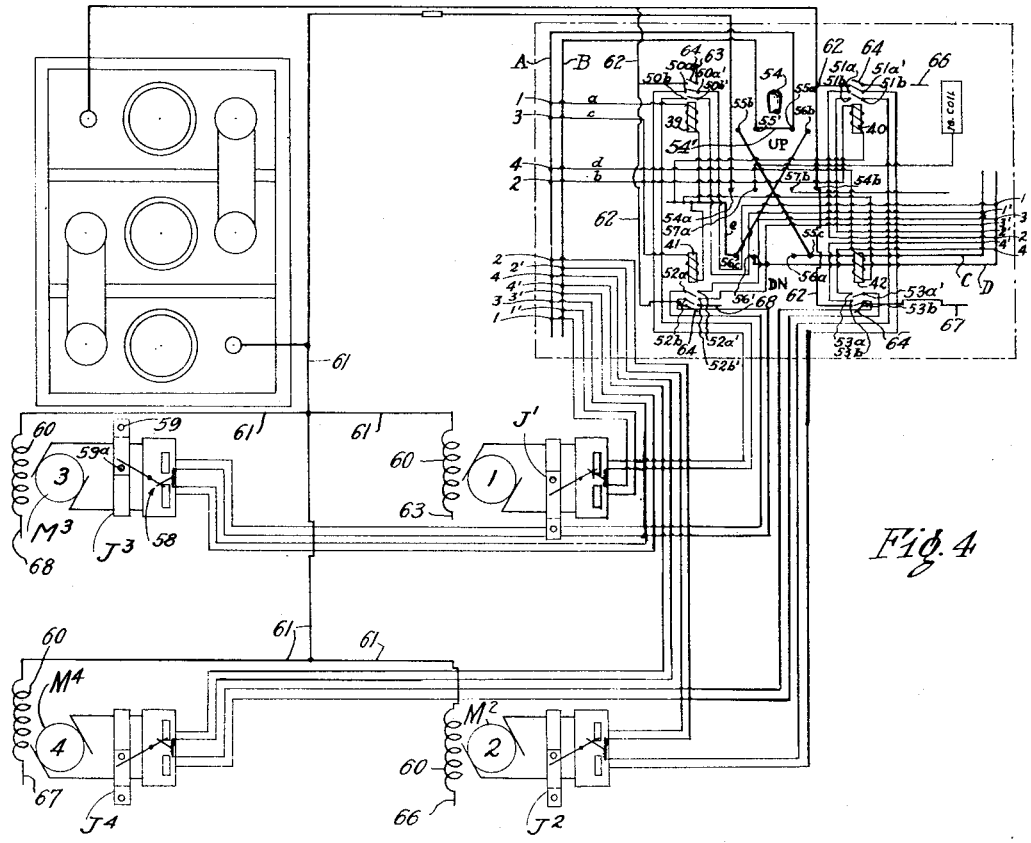
Fig. 4 is a diagram of the electric circuits for the installation.

In Fig. 4, the individual magnet circuits are indicated at a, b, c and d and the main magnet circuit line at e. Depression of the push button switches effects closure of switch members 50, 51, 52 and 53 (Fig. 6a), which bridge terminals 50ª—50ª′, 50ᵇ—50ᵇ′, 51ª—51ª′, 51ᵇ—51ᵇ′, 52ª—52ª′, 52ᵇ—52ᵇ′, 53ª—53ª′, and 53ᵇ—53ᵇ′, and close circuits which lead to the respective jack motors, these circuits being numbered in consecutive order in Fig. 4 in accordance with the respective jacks, which bear like numbers.

There are in effect two circuits for each jack motor, the "down" or jack extension circuit and the "up" or jack retracting circuit, and there are also two main "up" and "down" sides to the line, the flow of current from the battery being reversed in accordance with the side of the line which is closed to obtain the desired direction of rotation of the particular jack motor. The reversing switch mechanism is included in the switch assembly, indicated generally at S, and includes a hand lever 54 mounted on an insulation block 70. The extremities of the insulation block are connected to switch blades 54ª′ and 54ᵇ′ which blades are pivotally connected to the terminals 54ª and 54ᵇ extending through the base 43 connected directly to the battery circuit. The block 70 is provided with a pair of downwardly extending portions 70′ adjacent the switch blades which portions are bridged by a bar 54′ which bar is adapted to alternately engage pairs of switch contacts 55 or 56, which contacts are carried by the insulation blocks between the contact strips 54ᶜ and 54ᵈ on one side and contact strips 54ᵉ and 54ᶠ on the other side, and are connected to terminals 55′ and 55ª, and 56′ and 56ª, to electrically bridge said terminals which are connected with the main "up" and "down" sides or circuits. Insulated from contacts 55 and 56 and their corresponding terminals are knife switch members or contacts 54ᶜ, 54ᵈ, 54ᵉ and 54ᶠ which are provided with terminals 55ᵇ, 56ᵇ and 56ᶜ, 55ᶜ, and these switch members control the direction of flow of the battery current in the respective "up" and "down" circuits. Thus if switch lever 54 is thrown forward, or to the right in Fig. 5a, bar 54′ bridges the contacts 55 leading to the terminals 55′ and 55ª and effects closure of conductors A and B.

The "up" side of the line is simultaneously connected to the battery, the terminals 54ª and 54ᵇ making contact through the switch blades 54ª′ and 54ᵇ′ with 54ᶜ and 54ᵈ which results in 54a being connected to 55ᵇ and 54ª being connected to 56ᵇ; these are in turn connected by the cross-over wires to the terminals 56ᶜ and 55ᶜ respectively, which in turn are connected to lines e and C.

When lever 54 is in an intermediate position it is in "neutral", and at this position it maintains ignition control switch 57, note particularly Fig. 5b, closed. Switch 57 is in effect a safety switch, since it is adapted to control the starting current to the engine of the vehicle and insure against possible starting of the car when any one or all of the jacks are up or in operation. Accordingly, this switch has terminals 57ª and 57ᵇ which may be connected into the ignition or other circuit essential to operation of the vehicle motor. Switch 57 is depressed against spring tension in a housing 57ᶜ by means of a cam member 57′ mounted on the said insulation block below bar 54′, at which time terminals 57ª and 57ᵇ are bridged, but when cam member 57′ is moved clear of said switch, the latter moves upwardly and breaks the circuit.

It is desirable to halt the drive on the jack motors automatically when the jacks reach either an extended or a retracted position, and this is provided for by the switch assembly illustrated in Figs. 7, 7a and 7b. In the preferred form these switches each consists of a casing 58 having connected thereto terminals 58ª and 58ª′ connected by conductors 1′ and 1 respectively to lines B and A and 58ᵇ and 58ᵇ' which are connected to terminals 50ᵃ and 50ᵇ of the switch S. Terminals 58ᵇ and 58ᵇ', and 58ᵃ and 58ᵃ, are adapted to be bridged by switch members or contacts 58ᶜ and 58ᵈ, which are depressed against spring tension preferably by a toggle or lost motion double-throw switch assembly comprising links 58ᵉ and 58ᶠ, contact member 58ᵍ and spring 58ʰ. Link 58ᶠ is slotted where it connects with link 58ᵉ to provide a lost motion joint. A pair of spaced contact members are operatively connected to the jacks, said contact members being indicated at 59 and 59ᵃ in Fig. 2 and at 59ᵇ and 59ᶜ in Fig. 3. When the jack sleeve reaches its extended and retracted positions, lever 58ᶠ engages either contact 59 or 59ᵃ of the double throw jack or 59ᵇ, 59ᶜ of the single throw jack and throws the switch over dead center. In Fig. 7, contact 58ᵍ has moved out of contact with contact 58ᵈ and the former has passed dead center and into engagement with contact 58ᶜ.

Although we have shown the motors as being reversible by changing the current flow to the motors through the commutator, it is obvious that this connection could be made to the fields and function equally well. The field coils 60 are energized by lines 61 connected to the negative side of the battery while connection to the other terminal of the field coil is made from the positive side of the battery through lines 62 to switches 64 and thence from switches 64 through lines 65, 66, 67 and 68 to motors 1, 2, 3 and 4 respectively. Since the current for the field coils is always in the same direction, it is merely necessary to use simple single pole, single throw switches in this part of the circuit, which switches can be included and operated with the switches 50 to 53 inclusive.

The operation is substantially as follows:

In the diagram of Fig. 4, the "up" side of the line is closed, while the "down" side of the line is open, the switch lever 54 having been thrown forward and connecting the battery terminals 54ᵃ, 54ᵇ with the terminals 55ᵇ and 56ᵇ and bridging terminals 55' and 55ᵃ of the "up" side of the line, this action also connecting the magnet circuit line e with the battery circuit. If now the push-button switch 44, for example, be pressed by the finger or thumb of an operator, the solenoid or magnet circuit a which it controls will be closed and simultaneously switch terminals 50ᵃ—50ᵃ' and 50ᵇ—50ᵇ' will be bridged by contacts 50 and the circuit to motor M¹ will be closed, as shown in Fig. 4.

The flow of current can now be traced from terminal 56ᵇ to 56ᶜ through main solenoid line e to the line a of solenoid 39. The solenoid 39 will now be energized and will hold the push button 44 and its contacts depressed. The circuit goes through line a to main line A through terminals 55ᵃ, 55' through main line B and on through line 1' of the jack motor circuit, through motor M¹, on through line connected to terminals 50ᵇ and 50ᵇ' to main line C, through terminal 55ᶜ to terminals 55ᵇ and 54ᵃ to battery circuit. The solenoids are provided to hold the push-button switches closed so that the operator may remove his finger or thumb once contact is established. Should it be desired to stop the jack at an intermediate position, or at any point in between a fully extended or closed position, the reversing lever 54 is moved to neutral, whereupon the motor and solenoid circuits are broken and the drive halted.

Assuming that the double throw jack, shown in Fig. 2, is being used, then motor M¹ will rotate gear 11, which in turn will rotate screw 8 and drive the sleeves 7 and 6 downwardly in respective order. The drive on the motor will continue until contact member 59 throws lever 58ᶠ of the jack switch which is associated with jack J¹, or the reversing lever 54 is moved to "neutral", whereupon the circuit will be broken and the drive on the motor stopped.

When it is desired to lower the vehicle wheel or other part with which the jack is associated, the lever 54 will be thrown back and thereby connect battery terminals 54ᵃ, 54ᵇ with terminals 56ᶜ and 55ᶜ and at the same bridge terminals 56', 56ᵃ and close the "down" side of the line and open switch 55 and the "up" side of the line. If now the push button 44 be again depressed, the circuit will again be closed to solenoid 39 and jack J¹, but in this instance the current will be reversed in the jack motor circuit, and the jack lift sleeves 6 and 7 will be retracted in respective order until contact 59ᵃ engages lever 58ᶠ and breaks the circuit to the motor, whereupon the drive will again be halted. The flow of current in the "down" circuit can be traced from terminal 56ᶜ through line e, solenoid 39, line a, main line A to line 1, through motor M¹ on through line 1 across switch terminals 50ᵃ—50ᵃ', on through line 1 to main line D, across switch terminals 56'—56ᵃ to terminal 55ᶜ and to battery.

A simplified showing of the foregoing is illustrated in Figs. 8 to 10 inclusive, wherein the circuit has been restricted to the operation of but one jack J¹, and its corresponding motor M¹. The circuit for the remaining motors will obviously operate the same since the operation of any one circuit is dependent upon which one of the buttons 44 to 47 inclusive (Fig. 6) is actuated. Fig. 8 shows the complete connections, both for the up and down positions of the jack; Fig. 9 shows only the connections used during the extending or up position; and Fig. 10 shows only the connections used in the retracting or down position. Current from the storage battery is conducted through the wires marked "positive" and "negative" to the terminals 54ᵃ and 54ᵇ. The circuit will now be described as though the current were passing through the positive wire and the circuit and returning eventually to the negative wire. Current from the terminal 54ᵃ goes to the main switch 55ᵇ and crosses over to the terminal 55ᶜ and line C. Thence it is conducted to the contacts 50ᵇ' and 50ᵇ which are actuated by the push button 44 and through the conductors from these terminals to the switch contact 58ᵇ' on the jack. The toggle switch member 58ᶠ has previously been actuated by the member 59 to close the switch connecting this conductor to the motor and the current goes to the motor through the conductor 100, from the motor through the conductor 101 to the contact 58ᵃ and thence through conductor 1' to conductor B. From B it is conducted to contacts 55' and 55ᵃ which are bridged by the member 54' on the main switch and is thence conducted to the conductor A and through the conductor a and solenoid 39, energizing the solenoid, to the conductor e through contact 56ᶜ, across to 56ᵇ and thence to 54ᵇ, which has been designated as connected to the negative line. The solenoid maintains the contacts 50ᵇ and 50ᵇ' closed, until the movement of the jack arrives at a position where the element 59 on the jack strikes the lever 58ᶠ and opens the contact 58ᵇ which opens the circuit, de-energizing the solenoid, opening contacts 50ᵇ and 50ᵃ'. The snap action of the switch due to the toggle mechanism in the switch 58 immediately closes the switch 58ᵃ'. This being accomplished after the opening of the switch contacts 58ᵇ due to the spring in the switch. This leaves the jack switch 58 actuated to a position where when the main switch is thrown to the down position, the motor will be reversed and the jack retracted.

The retracting or down position is shown in Fig. 10. The current enters the conductor through the positive conductor, passes through terminal 54ᵃ to 56ᶜ through the conductor e which is connected to the solenoid 39 and thence through conductor a to the conductor A through conductor l down to the terminal 58ᵃ' of the switch 58, thence through the motor of the jack, out through the contact 58ᵇ to the contacts 50ᵃ and 50ᵃ' and thence down to the main conductor D where it goes to contacts 56', and 56ᵃ which are bridged by the member 54' to contacts 55ᶜ and 54ᵇ and thence to the negative of the storage battery. When the jack has been fully retracted the member 59ᵃ operates the lever 58ᶠ of the toggle switch opening the contacts 58ᵃ', opening the circuit, de-energizing the solenoid 39 and releasing the contacts 50ᵃ and 50ᵃ'. Immediately thereafter, due to the snap action and momentum of the switch, the contacts 58ᵇ in the jack switch 58 are closed, placing the jack in a position for extending the jack when it is again desired to raise the same.

It will be understood that the switches herein shown and described and the arrangement of the circuits may, to a certain extent, be varied and rearranged, and that variations and modifications in design of the remaining parts may be adopted within the scope of the invention as defined by the appended claims.

We claim:

1. In a jacking system, a double-throw jack comprising a housing, inner and outer telescoping lift members mounted in said housing, a screw for driving said inner lift members, said inner lift member being provided with an abutment at its upper end adapted to engage the outer lift member after it has been fully extended and move it into driving engagement with said screw, and means for locking the inner and outer lift members to one another when the inner lift member reaches an extended position, said means comprising expansible members arranged to be expanded by said abutment and thereafter engage over the top of the latter and hold it in extended position in the lower extremity of the outer lift member.

2. In a jacking system, a double-throw jack comprising a housing, inner and outer telescoping lift members mounted in said housing, a screw for driving said lift members, said inner lift member being provided with an abutment at its upper end adapted to engage the outer lift member after it has been fully extended and move the latter into driving engagement with the screw, means for locking the inner and outer lift members to one another when the inner lift member reaches an extended position, said means comprising expansible lock members arranged to be expanded by said abutment and thereafter engage over the top of the latter and hold it in extended position in the lower extremity of the outer lift member, and means for automatically unlocking said lock member when the inner sleeve is retracted.

3. In a jacking system, a double-throw jack comprising a housing, inner and outer tubular lift members arranged in telescoping relation in said housing, a screw for driving said lift members, said inner lift member being provided with an abutment at its upper extremity adapted to engage the outer lift member when the inner lift member reaches its extended position and thereby move the outer lift member into driving engagement with the screw, and means for locking the inner lift member to the outer lift member when the inner lift member reaches an extended position, said means comprising a pair of expansible segments which are mounted in the lower extremity of said outer lift member and have upper cam faces arranged to be contacted by said abutment to permit movement of the latter to a position below said segments, and means for expanding said segments when the inner lift member is retracted.

JOSEPH D. PETSCHE.
VICTOR BEZJAK.